United States Patent [19]

Kudelski

[11] Patent Number: 4,500,817

[45] Date of Patent: Feb. 19, 1985

[54] TAPE TENSION SENSOR AND SERVO EMBODYING SAME

[75] Inventor: Stefan Kudelski, Le Mont-sur-Lausanne, Switzerland

[73] Assignees: Kudelski, S.A., Lusanne, Switzerland; Ampex Corporation, Redwood City, Calif.

[21] Appl. No.: 533,163

[22] Filed: Sep. 15, 1983

[30] Foreign Application Priority Data

Sep. 17, 1982 [GB] United Kingdom ................. 8226569

[51] Int. Cl.³ ........................................... B65H 59/38
[52] U.S. Cl. ....................................... 318/7; 242/189; 242/75.44; 242/147 R; 360/74.3
[58] Field of Search ................ 318/6, 7; 360/73, 74.3; 242/189, 75, 75.3, 75.42, 75.43, 75.44, 75.51, 147 R, 147 M

[56] References Cited

U.S. PATENT DOCUMENTS

| 2,512,372 | 6/1950 | Pakala | 318/6 X |
| 2,981,491 | 4/1961 | Eans | 318/6 X |
| 2,986,688 | 5/1961 | Dunigan | 318/6 X |
| 3,060,358 | 10/1962 | Peeples et al. | 318/6 |
| 3,105,179 | 9/1963 | Young et al. | 318/6 |
| 3,244,954 | 4/1966 | Branco | 318/7 |
| 3,734,368 | 5/1973 | Kudelski | 318/7 |

Primary Examiner—J. V. Truhe
Assistant Examiner—Bentsu Ro
Attorney, Agent, or Firm—Harry G. Thibault; Joel D. Talcott

[57] ABSTRACT

A tape loop sensing arm is mounted for rotation with a plate (31) which extends into a core (37) and carries shaped lossy strips (34) for altering the quality factor of a coil (36) carried by the core.

13 Claims, 6 Drawing Figures

TAPE TENSION SENSOR AND SERVO EMBODYING SAME

BACKGROUND TO THE INVENTION

This invention relates to tape transports for the traversal of magnetic tape past a recording and/or playback head and in particular to an improved tape tension sensor for use in such a transport.

In most kinds of magnetic tape recording and playback machines, magnetic tape is transported along a path defined by a plurality of guides from a supply reel of tape past a recording or playback head to a take-up reel. The tape is usually driven by a capstan engaging the tape at an appropriate location along the path, the location depending on the particular machine. In many machines, particularly although not exclusively machines adapted for the recording of television signals on magnetic tape, at least one loop of tape is formed by the guide system at a convenient location along the path of the tape. The tension of tape in this loop is sensed in order, for example, to provide servomechanical control of the speed of an associated supply or take-up reel. It will be appreciated that the capstan is the prime mover of the tape past the recording or playback head but where the reels for the tape are of substantial size, it is desirable to drive the supply and take-up reel separately from the capstan in order that the capstan need only move the tape and does not require to produce any torque for moving the supply reel. However, where the supply and take-up reels are separately driven, it is usually desirable to control their speeds servomechanically in order to maintain the tension of the tape both upstream and downstream of the capstan at a reasonably constant value.

In many arrangements, a loop of tape is engaged by a guide roller which is mounted for translational movement so that as the tension in the tape forming the loop varies, the tape guide moves accordingly. This movement may be sensed in order to provide a control for the respective take-up or supply reel.

Very many proposals have been made for measuring the tension in a tape by sensing the length of a loop of tape in order to provide a control for an associated servomechanism which regulates the tape tension. Many of these proposals are of complex construction and suffer from the considerable disadvantage that it is difficult to linearise or otherwise control the relationship between a parameter (which may be either the loop length or the tape tension) and an output signal from a transducer cooperating with the movable guide to produce an indication of the sense and magnitude of the controlling parameter.

Accordingly, it is an object of the present invention to provide an improved tape loop sensor for a tape transport.

Another object of the invention is to provide an improved tape loop sensor in which the provision of a desired relationship between a controlling parameter and the output of an associated transducer is rendered more feasible.

Another object of the invention is to provide an improved tape loop sensing arrangement including a loop sensor and a transducer of comparatively simple design for providing a signal indicative of the tape tension.

SUMMARY OF THE INVENTION

In a preferred form of the invention, a guide member for engaging a loop or tape is mounted on a movable member, for example a pivoted arm, so that the movable member can move in response to a change in the tension of the tape which the guide member engages. Mounted for movement with the movable member is a plate member which carries at least one shaped strip of lossy material. The plate member extends into a gap in a magnetic core on which a sensing coil is disposed. This sensing coil preferably forms part of the resonant circuit of an oscillator which produces an oscillatory signal of which the amplitude can be monitored by a detector. As the guide member moves in response to changes in the tape, the plate member and its lossy strip or strips move the aforesaid gap to change the energy loss in the resonant circuit, i.e. to vary the quality factor of the coil. This variation of quality factor will vary the amplitude of oscillation of the oscillator and the detector responsively produces a direct output which thus varies as the tape guide is moved in response to changes in tape tension. "Lossy material" means, in the context of this application, a material that effects the energy loss in a frequency determining resonant circuit associated with an oscillator when interacting with the reactive field of a reactive element included in the resonant circuit without producing more than a negligible change, if any, in the resonant frequency of the oscillator. In embodiments using a coil as the reactive element, the lossy material interacting with the magnetic field produced by the coil may be constituted as conductive nonmagnetic materials, such as copper, or magnetic materials, such as ferrite, which exhibit significant energy losses at the frequency of operation of the associated resonant circuit. It will be appreciated, however, that a capacitor type reactive element can be employed in the frequency determining resonant circuit associated with the oscillator to effect a variation in the quality factor of the resonant circuit with a variation in the tension of the tape. In such embodiments, the capacitor has a movable element carrying a suitable lossy material interacting with the electric field produced by the capacitor. In any case, the lossy material is selected and formed for use with the reactive element so that the quality factor of the circuit remains appreciably greater than unity throughout its range of variation so that the oscillator remains capable of producing an oscillatory output without more than a negligible change in its resonant frequency. If the reduction of non-linearity is required, then although there are several sources of non-linearity, namely between the tape tension and the movement of the arm, between the movement of the arm and the variation of the quality factor of the coil and between the variation in the quality factor and the output signal produced by the associated electrical circuit, one of these relations, namely that between the movement of the arm and the quality factor of the coil, is controllable by choosing an appropriate shaping for the metallic strip and in practice, whether empirically or by design, the other non-linearities may be compensated.

The foregoing and other objects of the invention will be apparent from the following description of a particular embodiment of the invention.

DESCRIPTION OF THE PREFERRED EMBODIMENT

Figure 1:
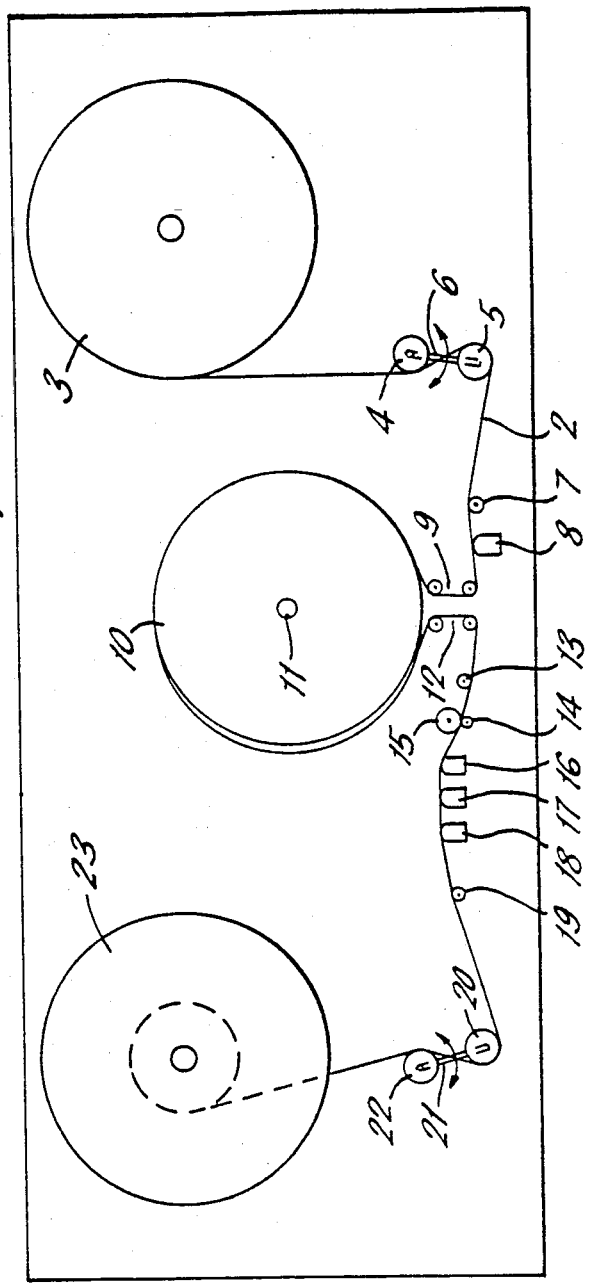
FIG. 1 is a schematic diagram of a tape transport in which the present invention may be employed.

FIG. 1 illustrates in simplified and diagrammatic form the main elements of a tape transport forming part of a battery operated portable video tape recorder. It will be understood that the invention is not intended to be confined to use in such a recorder.

In the apparatus 1 shown in FIG. 1, a magnetic tape 2 is, in the normal mode of operation of the apparatus, supplied from a reel 3 driven by a servocontrolled motor (not shown). The tape passes around a guide 4 and is formed into a shallow loop by a rotary guide 5 carried at one end of a sensing arm 6 pivoted, coaxially with the guide 4, for arcuate movement in the general plane of movement of the tape. The loop extends from the guide 5 to another guide 7. From the guide 7 the tape extends past a video erase head 8 and then around a pair of upright rotary guides 9 which serve to guide the entry of the tape into a helical path extending around a scanning drum 10 which is slightly tilted, the axis 11 of the drum being oblique to the general plane of movement of the tape. The end of the helical path of the tape around the drumm is defined and controlled by a pair of upright rotatable cylindrical guides 12. The pairs of guides 9 and 12 defined an "omega" wrap of the tape around the scanning drum, which includes, as is usual, a scanning head mounted on a carrier driven around the periphery of the drum so that the tape can be scanned in a multiplicity of parallel tracks each extending obliquely, at a slight angle, relative to the length of the tape in a generally known manner.

From the exit guides 12 and the tape proceeds past a guide 13 and a capstan 14 which is associated with a pinch roller 15, the tape path then extending past ordinary erase, audio and control track heads 16 and 18. The tape passes around another fixed guide 19 which defined one end of a take-up loop the length of which is sensed by a rotatable roller guide 20 mounted, at one end of a sensing arm 21 pivoted so that, in a manner similar to the arm 6, the arm 21 can execute a pivotable movement in a general plane of movement of the tape. The tape path extends around a guide 22, coaxial with the pivot of the arm 21 and the tape is taken up by a reel 23.

For the sake of simplicity, the various controls and motors for the scanning head, the capstan and the take-up reel have likewise been omitted.

As is well-known, in order to control the tension in the tape, it is appropriate to monitor the lengths of the loops engaged by the tape guides of the sensing arms 6 and 21 and to control the energisation of the motors for the supply and take-up reels accordingly. Although the manner in which this may be achieved ddoes not form any part of the present invention, it will be apparent that, for example, an increase in the tape tension in the loop engaged by the guide roller 5 at the end of the sensing arm 6 will cause the arm 6 to pivot. The pivoting movement is usually resisted by a restoring spring (not shown), The pivoting movement may be sensed by a variety of known means and used as an error control signal in the servomechanical control of the supply reel 3 in order, in this particular case, to increase the speed of the reel and restore the tape tension to the desired mean value.

It is desirable that the tape makes an approximately 90° turn about the guide 5 (or the guide 20) when the associated arm is in its mean position and the tape is at its required tension.

Figure 2:
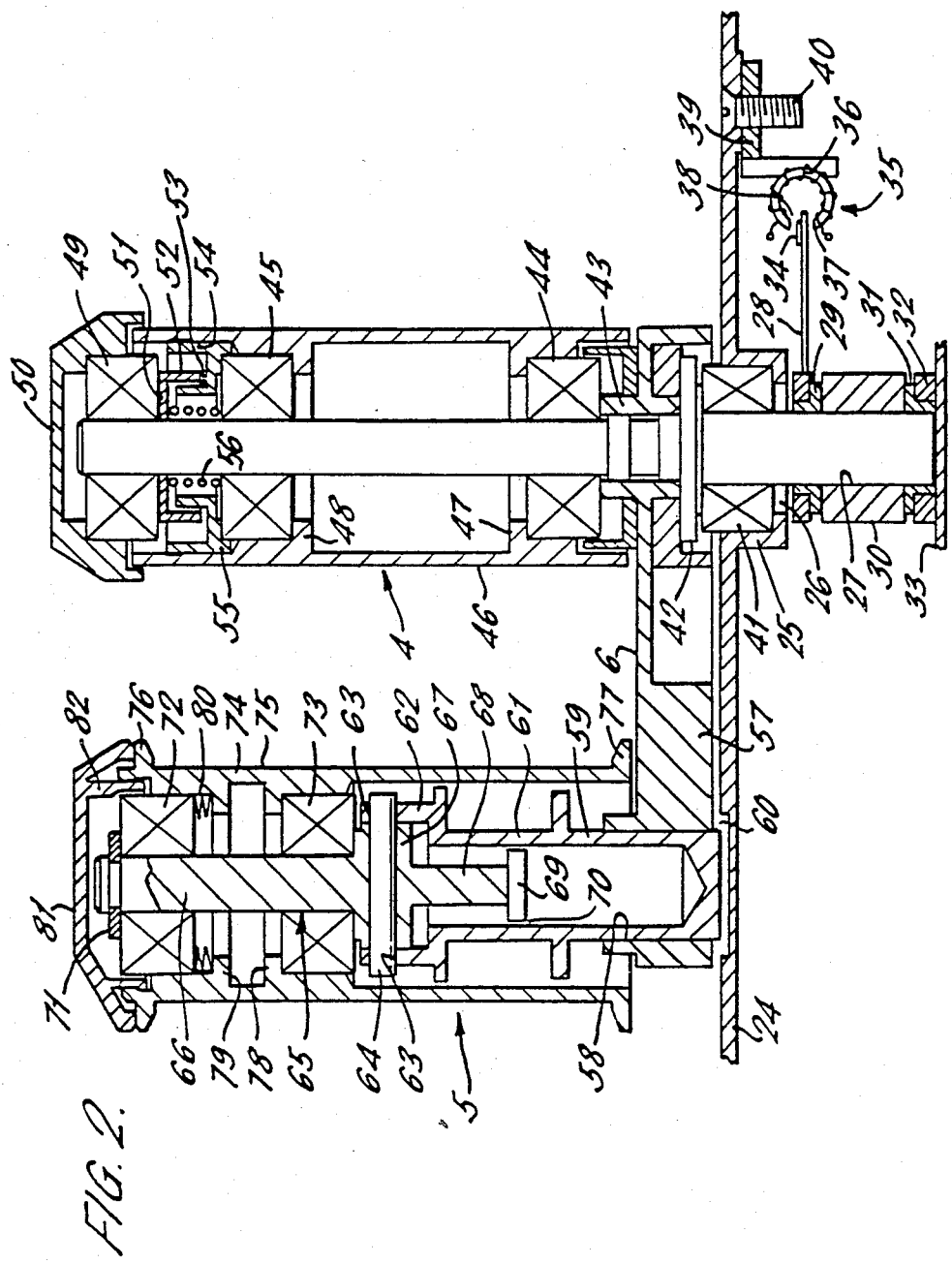
FIG. 2 is a slightly simplified sectional view of a sensing arm including a position sensing transducer.

FIG. 2 illustrates the assembly of the guide 4, the guide 5 and the arm 6, including the mechanical parts of the sensor which provides an indication of the angular position of the arm 6.

The deck 24 of the recorder is dished at 25, the bottom of the disch having a central aperture 26 for the accommodation of an upright shaft 27 which is disposed normal to the general plane of the arm 6.

The shaft 27 extends downwardly from the sensing arm below the aperture 26 in the dish 25. On the lower part of the shaft 27 is mounted a sector shaped insulating plate 28, disposed generally parallel to but below the sensing arm 6. The plate 28 is carried on a collar 29 rigidly secured to the shaft 27. Below the collar 29 is a bushing 30 below which is a collar 31 resting on a seat 32 disposed on a lower deck 33.

The plate 28 forms part of a position sensing device. The plate 28 is of a rigid synthetic plastic and serves as a carrier for shaped strips 34 of a lossy materal, which may be a non-magnetic metal such as copper in which eddy currents are induced by magnetic fields. The plate 28 cooperates with a magnetic sensing head 35 constituted by a coil 36 wound on a core 37 formed with a gap 38 into which the plate 28 extends. The core 37 is carried by a bracket 39 secured by a screw 40 to the deck 24.

As is explained later with reference to FIGS. 3 to 5, the coil is intended to form part of an oscillator circuit of which the amplitude of oscillation is altered in response to variation of the quality factor of the coil as the plate 28 moves in the gap 38.

The dish 25 accommodates a bearing 41 for the shaft 27. The shaft has a collar 42 which is supported by the bearing 41 and supports the arm 6 which at its inner end includes a hollow bush 43 keyed to the shaft 28.

Supported by the bush 43 is a bearing 44, which constitutes the lower of two bearings 44 and 45 by which a cylindrical guide member 46 is rotatably mounted, for rotation about its longitudinal axis, on the shaft 27. The cylindrical guide member 46 has internal flanges 47 and 48 engaging the bearings 44 and 45.

The top of the shaft 27 is received in a bearing 49 which is retained within a cap 50. Below the bearing is an annular plate 51 with a downwardly extending peripheral flange 52, which extends between two upwardly extending flanges 53 and 54 of an annulus 55 which is secured within the guide member 46 and supports the bearing 45. The flanges 52, 53 and 54 constitute a dust trap. Between the plate 51 and the bearing 45 is a helical compression spring 56 encircling the shaft 27. For rigidity of the shaft 27, the cap 50 may be secured to a suitable frame member (not shown) extending to the deck 24 such as not to interfere with the feeding of the tape.

At its outer end, the arm 6 has a portion 57 of greater thickness than the remainder of the arm 6. This portion 57 has a bore 58 in which is supported an upright hollow post 59. The post extends slightly below the bottom surface of the portion 57 and the upper surface of the deck 24 is provided with an arcuate recess 60 so as to provide adequate clearance between the bottom of the post 59 and the deck over the range of arcuate movement which the end of the sensing arm will normally execute.

The post 59 has a cylindrical wall 61 which at its upper end is shaped to form an inverted yoke 62. Extending across the yoke and secured as by means of adhesive in diametrically opposite bores 63 in the yoke 62 is an axle 64 which is aligned in a direction parallel to the arm 6 and disposed thereby in a direction radially of the pivot axis of the arm, said pivot axis being defined by the axis of the shaft 27.

The axle 64 provides a pivot for a spindle 65 which has an upper part 66, a middle part 67, of somewhat greater diameter, and a lower part 68. The middle part 67 of the spindle 65 constitutes a hub for the axle 64 and thereby the spindle 65 can pivot about the axis defined by the axle 64. The lower part 68 of the spondle 65 extends downwardly into the interior of the post and is provided with a foot 69 which has a small clearance between it and the wall 61 of the post 59. The clearance cannot be explicitly shown in the drawing, because the crucial dimension is normal to the plane of FIG. 2, but the wall 61 and the hollow post 59 being cylindrical, the clearance is indicated by the gap 70 between the foot 69 and the wall 61 as shown in the drawing.

At the upper end of the spindle 65, the spindle carries a collar 71. Below the collar and surrounding the spindle are two bearings 72 and 73. These provide a rotary mounting for a generally cylindrical guide member 74 around which the tape is to pass. The guide member 74 has a generally cylindrical outer surface 75 and at each end the guide member has rims 76 and 77 which restrict the vertical movement of the tape on the guide member. At its inner surface the guide member 74 has internal ribs 78 and 79, which extend between the bearings 72 and 73 and of which the rib 79 supports a packing ring 80 immediately beneath the upper bearing 72.

The guide member 74 has a top cover 81 which has a downwardly extending annular rib 82 fitting within the inner periphery of the cylindrical part 75 of the member 74.

The construction aforedescribed permits the guide member 74 to rotate about an axis in a plane tangential to the arcuate path of the respective end of the sensing arm 6 and also permits the guide to rock in the same plane but only in this plane. The pivotal rocking movement is limited to a few degrees by means of the foot 69 and the interior of the wall 61 of the post 59.

Figure 3:
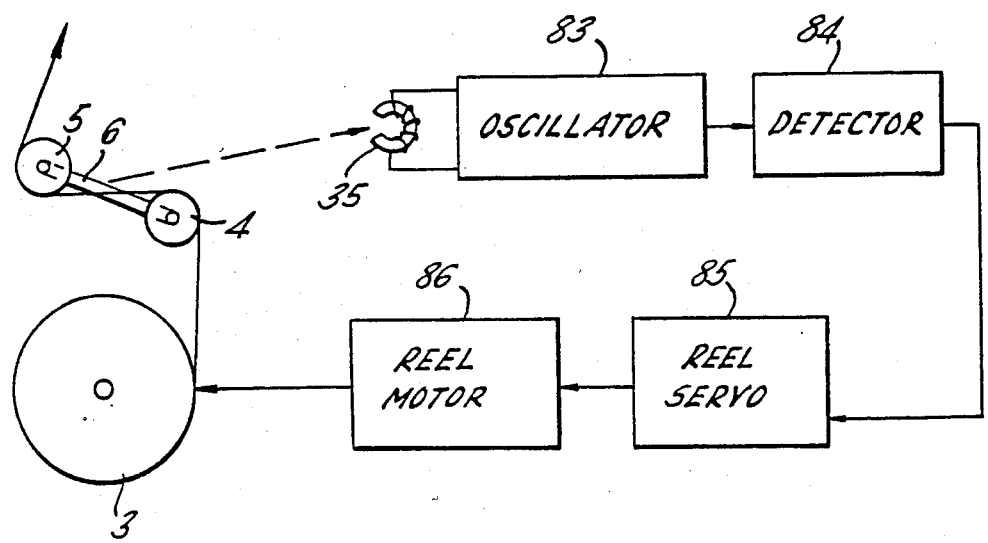
FIG. 3 is a schematic diagram of a servomechanism which may be employed in the tape transport of FIG. 1.

FIG. 3 illustrates the principal parts of a servo-mechanism for the control of the tape supply reel 3 in the tape transport shown in FIG. 1. FIG. 3 illustrates the tape supply reel 3, and the tape extending therefrom around the guide 4 and the guide 5. There is formed around the guide 5 a loop in which the tension is sensed by the movable arm 6 carrying the guide 5.

FIG. 3 illustrates diagrammatically the operative connection between the arm 6 and the sensing head 35, which in FIG. 3 is shown as associated with an oscillator 83 of which the amplitude of oscillation is detected by a detector 84 to produce an output signal. The output signal of the detector 84 is fed to an input of a reel servo 85 which may be of any suitable form for controlling a motor 86 to drive the reel 3 and regulate the tension in the tape loop.

Figure 4:
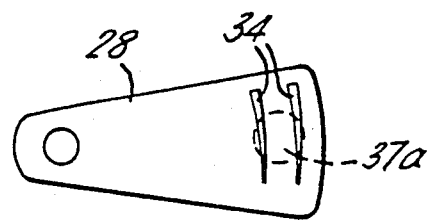
FIG. 4 illustrates a detail of a transducer associated with the sensing arm.

FIG. 4 illustrates schematically a detail of the transducer constituted by the plate 28 and the lossy strips 34. A preferred form will be further described with reference to FIG. 6. In FIG. 4 the plate 28 is shown centralised with respect to the gap in the core, which is illustrated by the dash circle 37a in FIG. 4. The metallic strips 34 extend along arcuate paths generally coaxial with the axis of rotation of the plate 28 and accordingly of the sensing arm and are tapered. The strips 34 are of copper but may be ferrite as previously mentioned. As the plate 28 rotates, the strips protrude variably into the gap in the core 37.

It is an advantage of the present invention that the extent to which the quality factor of the coil is altered by the strip or strips 34 is very largely controllable by means of shaping of the strips. The relationship between the position of the plate 28 and the quality of the coil is a function of the shape of the lossy strips 34 but the variation of the quality factor with position of the plate 28 (and accordingly of the position of the guide) can be adjusted within very wide limits. It is possible to compute the relationship between the variation in loop length (and hence tension of the tape in the loop) and the variation in output for the oscillator circuit shown in FIG. 5 (or other circuit if a different kind of circuit is used) and to determine either by computation or empirically the desired shape of the strip or strips 34. Ordinarily, it is desirable that the relationship between the variation in loop length and variation in output of the oscillator be established so that a linear relationship is obtained between the variation in tape tension and the output of the oscillator. Of course, it may conversely be desirable not to linearise the relationship between the controlling parameter and the final electrical output but to choose a specific non-linear relationship.

Although a variety of materials would be suitable for the strips 34, one particular advantage of the use of copper is the ease with which it can be shaped for experimenting, for example from ordinary copper-clad circuit board material. Moreover, when a final shape has been determined, it can readily be produced in quantity by inexpensive circuitboard etching techniques.

Moreover, another advantage of the use of copper and some ferrites is that the loss is comparatively independent of frequency, so that for example it is readily possible to limit the variation in frequency of the oscillator described below to ten per cent of the nominal frequency over the full measuring range.

Figure 5:
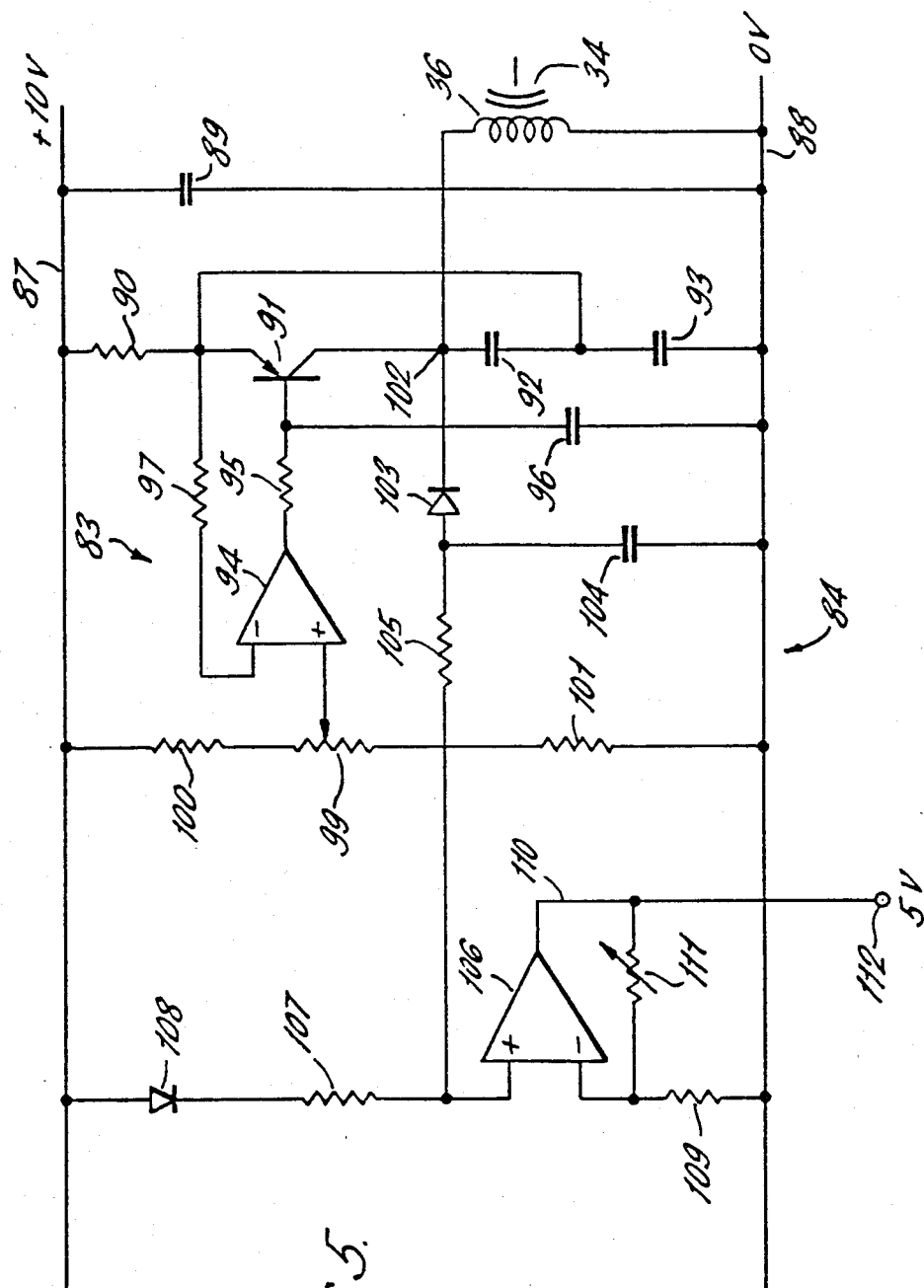
FIG. 5 is a schematic diagram of an electrical circuit associated with the transducer.

FIG. 5 illustrates a circuit for use with the transducer shown in FIG. 4. The circuit shown in FIG. 5 receives an electrical supply from a positive rail 87 and a zero volts rail 88. The voltage between the rails is stabilised by a capacitor 89. A resistor 90 connects the positive rail to the emitter of a transistor 91 of which the collector is connected to the negative rail by way of two capacitors 92 and 93 in series. The output of an amplifier 94, preferably of type 358 (such as made by Signetics Corp), is connected by way of a resistor 95 to the base of the transistor 91. The base of this transistor is connected to the zero volts rail 88 by way of a capacitor 96 and the emitter of the transistor 91 is connected to the inverting input of amplifier 94 by way of a resistor 97. The emitter of transistor 91 is connected to the junction of the capacitors 92 and 93. The non-inverting input amplifier 94 is connected to the wiper arm of a variable resistor 99 which is connected to the positive rail 87 by way of resistor 100 and to the negative rail 88 by way of resistor 101.

The amplifier 94 and the transistor 91 constitute the active components of the oscillator 83 of which the operating frequency is determined by the capacitors 92 and 93 together with the coil 36. The amplitude of the oscillation varies according to the quality factor of the coil 36 which, as previously mentioned, is varied according to the position of the lossy strips 34 relative to the magnetic core 35 about which the coil 36 is wound.

It is a further advantage of the invention that only one frequency-sensitive device is required, in distinctiong to known arrangements which compare two signals of which one signal is required to be at a fixed reference frequency and the other signal is at a variable frequency which is a function of the tape tension.

In order to monitor the amplitude of the oscillatory output of the oscillator, the detector 84 is coupled between the rail 88 and the point 102 between the capacitor 92 and the collector of transistor 91. The detector comprises a diode 103 which couples the point 102 to one plate of a capacitor 104 of which the other plate is connected to the rail 88. The upper plate of the capacitor 104 is connected by way of a resistor 105 to the non-inverting input of an amplifier 106 which may also be of type 358. This non-inverting input is connected to the positive rail 87 by way of a resistor 107 and diode 108. The inverting input of the amplifier 106 is connected to the zero volts rail 88 by way of a resistor 109 and to the output line 110 of the oscillator by way of a resistor 111. The output line of the amplifier 106 extends to an output terminal 112 nominally at five volts.

The purpose of the detector 84 constituted by the amplifier 106 and the associated components is to provide an output varying from 2 volts (when the tape tension is a maximum) to 8 volts (when the tape tension is a minimum), that is to say centred on 5 volts as the sensing arm carrying the rotary guide varies through its range of movement. Thus the output at terminal 112 will be 5 volts when the tension in the tape is at its preferred nominal value. The resistors 99 and 100 can be adjusted to shift the range and extent of the range of the output voltage if desired.

Figure 6:
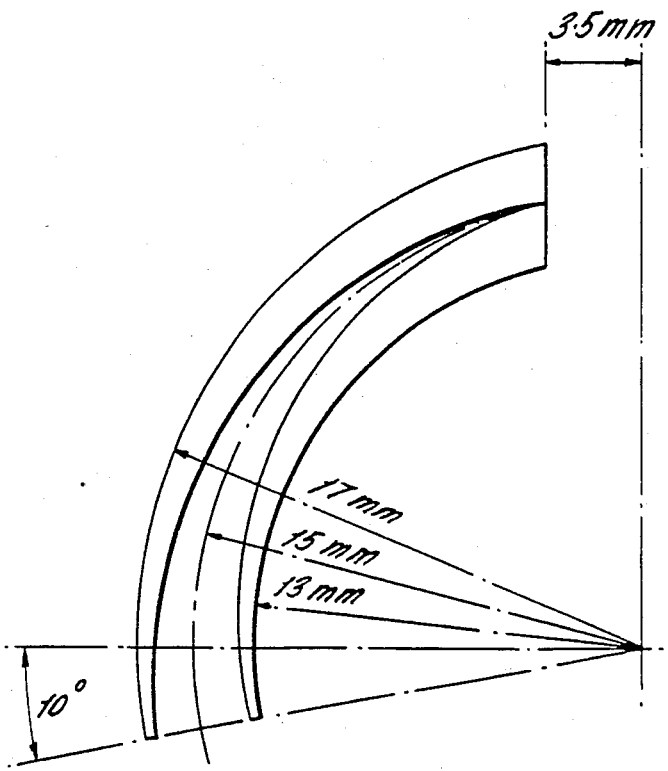
FIG. 6 illustrates a detail of the transducer.

A typical form for the strips 34 is shown in FIG. 6. The form is shown complete but may be truncated if desired. The copper strips are of a constant 0.2 mm thickness, since although variation in thickness is possible, variation in width is easier to control.

I claim:

1. A tape tension sensor for a magnetic tape transport apparatus, comprising:
   a guide member for engaging the tape;
   means mounting the guide member for movement in response to a change in the tension of the tape;
   a core member which includes a gap;
   a sensing coil disposed on the core member;
   a plate member mounted for movement conjointly with the guide member, said plate member extending into said gap; and
   at least one shaped strip of lossy material carried in the plate member, the said strip being capable of varying the quality factor of the coil as the guide member moves.

2. A tape tension sensor according to claim 1 in which the means for mounting the said guide member comprises a pivoted arm.

3. A tape tension sensor according to claim 2 in which the said strip comprises copper.

4. A tape tension sensor according to claim 2 or claim 3 in which said strip is tapered.

5. A tape sensor according to claim 3 wherein the quality factor of the coil varies as the guide member moves without changing the reactance value of the coil.

6. A tape loop sensor for a tape transport apparatus, the sensor comprising:
   a guide member for engaging a loop of tape;
   a pivoted arm carrying said guide member and capable of pivoted movement in response to changes of the length of said loop;
   a sensing coil; and
   carrier means mounted for movement with said arm in a position to extend adjacent said coil, the said carrier means including a shaped member, said shaped member comprises a tapered strip extending in a direction of relative movement between the carrier and the coil for varying the quality factor of said coil.

7. A tape loop sensor according to claim 6 in which the said carrier means comprises a plate of insulating material.

8. A tape loop sensor according to claim 7, further comprising a core for mounting said coil, said core including a gap, and wherein said plate extends into said gap.

9. A tape loop sensing arrangement comprising:
   a guide member for engaging a loop of tape;
   a pivoted arm carrying said guide member and capable of pivoted movement in response to changes of the length of the said loop;
   a sensing coil;
   carrier means mounted for movement with said pivoted arm in a position to extend adjacent said coil, said carrier means including a shaped lossy member for varying the quality factor of said coil;
   an oscillator;
   means including the coil for controlling the amplitude of oscillation of the oscillator; and
   means for detecting said amplitude to provide an output signal.

10. A tape tension sensing arrangement for use in a magnetic tape transport apparatus, the said arrangement comprising:
    a guide member for engaging the tape;
    means mounting the guide member for movement in response to a change in the tension of the tape;
    a core member which includes a gap;
    a sensing coil disposed on the core member;
    a plate member mounted for movement conjointly with the guide member, said plate member extending into the gap;
    at least one shaped strip of lossy material carried on the plate member, the said strip being capable of varying the quality factor of the coil as the guide member moves as aforesaid; and
    an electrical circuit, including said coil, for producing an electrical signal of which the amplitude is governed by the quality factor of said coil.

11. A tape tension sensor for a magnetic tape transport apparatus, comprising:
    a guide member for engaging the tape;
    means mounting the guide member for movement in response to a change in the tension of the tape;
    a reactive element establishing a reactive field zone; and
    a body of lossy material mounted for movement in the reactive field zone conjointly with the guide member, the said body being capable of varying the quality factor of the reactive element as the guide member moves.

12. A tape tension sensor for a magnetic tape transport apparatus, comprising:
- a guide member for engaging the tape;
- means mounting the guide member for movement in response to a change in the tension of the tape;
- a reactive element establishing a reactive field zone;
- a body of lossy material mounted for movement in the reactive field zone conjointly with the guide member, the said body being capable of varying the quality factor of the reactive element as the guide member moves;
- an oscillator;
- means including the reactive element for controlling the amplitude of oscillation of the oscillator; and
- means for detecting said amplitude to provide an output signal.

13. A tape tension responsive servo for controlling a motor that effects the transport of a magnetic tape in a tape transport apparatus, comprising:
- a guide member for engaging the tape;
- means mounting the guide member for movement in response to a change in the tension of the tape;
- a reactive element establishing a reactive field zone;
- a body of lossy material mounted for movement in the reactive field zone conjointly with the guide member, the said body being capable of varying the quality factor of the reactive element as the guide member moves;
- an oscillator;
- means including the reactive element for controlling the amplitude of oscillation of the oscillator;
- means for detecting said amplitude to provide an output signal; and
- a circuit for driving the motor in response to the output signal.

* * * * *